United States Patent
Blanc (10) Patent No.: US 11,685,615 B2
(45) Date of Patent: Jun. 27, 2023

(54) DEVICE FOR GROUPING FRUIT OR VEGETABLES INTO BATCHES WITH ACCUMULATION CHANNELS PROVIDED WITH BYPASS PASSAGES

(71) Applicant: MAF AGROBOTIC, Montauban (FR)

(72) Inventor: Philippe Blanc, Montauban (FR)

(73) Assignee: MAF AGROBOTIC, Montauban (FR)

( * ) Notice: Subject to any disclaimer, the term of this patent is extended or adjusted under 35 U.S.C. 154(b) by 164 days.

(21) Appl. No.: 16/762,474

(22) PCT Filed: Oct. 30, 2018

(86) PCT No.: PCT/FR2018/052696
§ 371 (c)(1),
(2) Date: May 7, 2020

(87) PCT Pub. No.: WO2019/097135
PCT Pub. Date: May 23, 2019

(65) Prior Publication Data
US 2020/0262661 A1  Aug. 20, 2020

(30) Foreign Application Priority Data
Nov. 15, 2017 (FR) ...................... 1760757

(51) Int. Cl.
*B65G 51/01* (2006.01)
*B65B 25/04* (2006.01)
*B07C 5/38* (2006.01)

(52) U.S. Cl.
CPC ............ *B65G 51/01* (2013.01); *B65B 25/045* (2013.01); *B07C 5/38* (2013.01); *B07C 2501/009* (2013.01);
(Continued)

(58) Field of Classification Search
CPC ............ B65G 51/01; B65G 2201/0211; B65B 25/045; B65B 25/046; B07C 5/38; B07C 2501/009
See application file for complete search history.

(56) References Cited

U.S. PATENT DOCUMENTS 3,337,049 A * 8/1967 Carlsen .................. B07B 13/07
209/250
3,470,670 A * 10/1969 Gorin .................... B65B 25/045
53/235

(Continued)

FOREIGN PATENT DOCUMENTS

WO   WO-2012056186 A2 * 5/2012 ............... B07C 5/38

OTHER PUBLICATIONS

International Search Report dated Feb. 13, 2019.

*Primary Examiner* — Anna K Kinsaul
*Assistant Examiner* — Luis G Del Valle
(74) *Attorney, Agent, or Firm* — IPSILON USA, LLP (57) ABSTRACT

The invention relates to a device for grouping into batches at least semi-buoyant objects belonging to the group of fruit and vegetables, comprising a plurality of accumulation channels (11), a hydraulic supply device for each accumulation channel (11), a device for supplying objects to an upstream portion of each accumulation channel, a collecting channel downstream of each accumulation channel (11), a device (14) for holding/releasing the objects in each accumulation channel Each accumulation channel (11) comprises at least one bypass passage (30) for the hydraulic stream extending from at least one inlet of the bypass passage (30) located upstream of the holding/releasing device (14) to at least one outlet of the bypass passage (30) issuing downstream of the holding/releasing device (14). A bypass valve (32) allows adjustment of said part of the diverted flow.

16 Claims, 4 Drawing Sheets

(52) U.S. Cl.
CPC ..... *B65B 25/046* (2013.01); *B65G 2201/0211* (2013.01)

(56) References Cited

U.S. PATENT DOCUMENTS

| | | | |
|---|---|---|---|
| 3,656,272 A | 4/1972 | Sheetz | |
| 4,946,584 A * | 8/1990 | Olney | B03B 11/00 209/498 |
| 5,704,733 A | 1/1998 | de Greef | |
| 2005/0210831 A1 | 9/2005 | Blanc | |
| 2013/0051932 A1* | 2/2013 | Ruissen | B65G 51/01 406/83 |
| 2016/0200468 A1* | 7/2016 | Ruissen | B65B 31/00 53/431 |

\* cited by examiner

DEVICE FOR GROUPING FRUIT OR VEGETABLES INTO BATCHES WITH ACCUMULATION CHANNELS PROVIDED WITH BYPASS PASSAGES

RELATED APPLICATION

This application is a National Phase of PCT/FR2018/052696 filed on Oct. 30, 2018 which claims the benefit of priority from French Patent Application No. 17 60757, filed on Nov. 15, 2017, the entirety of which are incorporated by reference.

BACKGROUND

Field of the Invention

The invention relates to a method and a device for grouping into batches at least semi-buoyant objects belonging to the group of fruit and vegetables (apples, pears, tomatoes . . . ) in at least one hydraulic channel for accumulating the objects in batches. Throughout the text, the expression "at least semi-buoyant object" is intended to mean any object having sufficient buoyancy in a hydraulic stream to be able to be transported thereby. Consequently, this expression covers not only the objects floating on the surface of the hydraulic stream, like the majority of varieties of apple, but also in particular the objects floating just below the surface, e.g. like pears, or even the objects floating in the hydraulic stream near, or on, the bottom of a hydraulic channel.

Throughout the text, the terms "upstream" and "downstream" are used with reference to the direction of flow of the objects in the grouping device, likewise corresponding to the direction of flow of the hydraulic stream transporting these objects.

Description of the Related Art

In installations for grading or sorting at least semi-buoyant objects belonging to the group of fruit and vegetables having channels for the hydraulic transportation of the objects (in particular ensuring that they are not damaged, such objects being sensitive to impacts and thus fragile), it is of interest to be able to reduce the total length of each accumulation channel, allowing the objects to be grouped in batches, and thus the footprint of the entire installation. Different devices to create a superposition of objects in such hydraulic channels have been proposed.

EP2931635 and U.S. Pat. No. 9,694,366 describe a grouping device with superposition, named hydraulic superposition, of the objects in the accumulation channels, not requiring any specific motorised mechanism and/or comprising numerous movable parts to create this superposition. In fact, it has surprisingly been noted that there is a speed range of the hydraulic stream in which the speed is sufficient to spontaneously cause this hydraulic superposition but is also relatively low and does not cause inappropriate turbulence or damage to the objects or furthermore overflow of the accumulation channel. In fact, the accumulated objects (which are possibly superposed) in the accumulation channel and the holding/releasing device which is transparent with respect to the hydraulic stream, oppose the flow of the hydraulic stream and produce a speed reduction in the hydraulic stream which can be relatively great and is greater the greater the height of superposition of the objects in the superposition zone. Consequently, it could be expected that a speed increase in the hydraulic stream during supply would produce turbulence phenomena and that the speed reduction caused by the accumulated products would produce an overflow of the hydraulic stream on the sides of the accumulation channel. However, this is not so in the majority of cases, in particular with objects floating on the surface such as the majority of varieties of apple, and it is noted in practice that there is a speed of the hydraulic stream sufficient to spontaneously cause a superposition of the objects whilst the holding/releasing device is in the closed state, yet without causing turbulence phenomena risking damage to the products or causing overflow of the accumulation channel.

However, the inventor has noted that in some situations there are risks of overflow of the hydraulic stream out of the accumulation channels.

In particular, when numerous accumulation channels are filled with objects—in particular objects superposed one on the other, held against the holding/releasing device—the total flow provided by the recirculation pump is not able to pass through the assembly formed by the different accumulation channels and is thus caused to overflow on the side of at least some of the accumulation channels.

Furthermore, some objects, when they accumulate superposed against the holding/releasing device of an accumulation channel form, at least from a certain amount of thus accumulated objects, a considerable barrier to the flow of the stream in the channel through these objects. This is the case in particular with objects with small dimensions and/or with certain objects such as pears which, owing to their particular shape and/or their low buoyancy, accumulate, being superposed over the entire height of the accumulation channel and by being fitted together leaving only small gaps for the passage of the stream therethrough. This results in a risk of overflow of the hydraulic stream upstream of the superposition zone. It would of course be possible to reduce the speed of the hydraulic stream to avoid such a risk. However, such a reduced speed is thus not necessarily sufficient to cause the hydraulic superposition and, if it is, in any case causes undesirable slowing of the operation of the device to the detriment of its productivity.

It is thus necessary to be able to maintain a sufficient speed of the hydraulic stream to cause the transport of the objects and their accumulation—in particular their superposition—in the accumulation channels, whilst avoiding any overflow of the hydraulic stream out of the channels.

It should be noted that although this problem arises acutely in the case of a grouping device with hydraulic superposition of objects as mentioned above, it may also arise with grouping devices with not fully hydraulic—i.e. at least partially mechanical (for example with a device forcing partial immersion of the objects) or fully mechanical, superposition of the objects, or even without any superposition of the objects.

It should also be noted that such grouping devices are used in particular in agricultural installations—in particular for sorting fruit or vegetables—and are not generally dedicated to a single family and variety of fruit or vegetables. In contrast, a single grouping device must be able to be used for various families and/or varieties and/or physical features (dimensions, weights, densities . . . ) of fruit and vegetables, and to do so in a simple and rapid manner, in particular without requiring complex settings or adjustments requiring the intervention of experts when changing the fruit or vegetables being processed. To this end, it is in particular important to avoid any risk of overflow of the hydraulic stream out of the accumulation channels regardless of the objects being processed and when changing the family and/or variety and/or physical features of the objects being processed.

OBJECTS AND SUMMARY

The invention thus aims to solve this general problem by proposing a device for grouping into batches at least semi-buoyant objects belonging to the group of fruit and vegetables in which the risks of overflow of the hydraulic stream out of the accumulation channels are absolutely avoided regardless of the circumstances.

The invention aims in particular to propose such a grouping device allowing various families and/or varieties and/or physical features of fruit or vegetables to be accepted without risking overflow of the hydraulic stream out of the accumulation channels.

The invention aims more particularly to propose such a grouping device with superposition—in particular hydraulic superposition—of objects in a superposition zone of each accumulation channel allowing various families and/or varieties of fruit or vegetables to be accepted without risking overflow of the hydraulic stream upstream of the superposition zone.

The invention aims more particularly to propose such a grouping device comprising a plurality of accumulation channels—in particular a plurality of accumulation channels all issuing into a single collecting channel—and in which the different accumulation channels are supplied from a single common pump, the specific flow rate of the hydraulic stream supplied to the inlet of each accumulation channel by the hydraulic supply device not having to be specifically individually adjusted to avoid overflows, and in particular not requiring a dedicated pump for each accumulation channel.

The invention aims more particularly to propose such a grouping device comprising at least one line, named grading line, for conveying, analysing and sorting objects based on predetermined criteria, said grading line comprising means for selectively discharging objects into different accumulation channels based on said predetermined criteria. It thus aims to propose such a grouping device particularly adapted to be able to be used as a unit for sorting objects based on predetermined criteria.

To this end, the invention relates to a device for grouping into batches at least semi-buoyant objects belonging to the group of fruit and vegetables, comprising:
  a plurality of channels, named accumulation channels,
  a hydraulic supply device adapted to form, in each accumulation channel, a flow of a hydraulic stream able to transport the objects along the accumulation channel,
  a device for supplying objects to an upstream portion of each accumulation channel,
  a hydraulic channel, named collecting channel, downstream of and in communication with each accumulation channel so as to be able to receive the hydraulic stream and the objects discharged by the accumulation channel,
  each accumulation channel being provided, at a downstream end thereof, with a device for holding/releasing the objects contained therein, this holding/releasing device being transparent with respect to the hydraulic stream flowing in the accumulation channel and allowing, in a closed position, the objects to be held in the accumulation channel whilst allowing the hydraulic stream to pass therethrough and, in the open position, allowing them to be released under the effect of the hydraulic stream to transfer them into the collecting channel,
  each accumulation channel has, at least in a downstream portion thereof, named superposition zone, a height greater than the maximum vertical size of each object so as to be able to receive superposed objects,
characterised in that each accumulation channel comprises at least one bypass passage for the hydraulic stream:
  extending from at least one inlet of the bypass passage located upstream of the holding/releasing device and upstream of the superposition zone, to at least one outlet of the bypass passage issuing downstream of the holding/releasing device,
  adapted to divert some of the flow of the hydraulic stream formed by the hydraulic supply device.

Since each accumulation channel is provided with at least one such bypass passage, the risks of overflow of the hydraulic stream out of the accumulation channels are absolutely avoided, and regardless of the nature (family and/or variety and/or physical features) of the fruit or vegetables being processed, regardless of the rate of filling—in particular superposition—of the different accumulation channels and regardless of the hydraulic supply rate and/or speed of each accumulation channel.

Therefore, it is possible to manage overall the entirety of the hydraulic circuit of the device from a single pump, in particular for supplying the different accumulation channels and the collecting channel, and to adjust the speed of the hydraulic stream in each accumulation channel solely to optimise the transport of objects and/or their superposition and/or productivity of the installation.

In some advantageous embodiments in accordance with the invention, each accumulation channel has, at least in a downstream portion thereof, named superposition zone, a height greater than the maximum vertical size of each object so as to be able to receive the superposed objects. Advantageously and in accordance with the invention, each accumulation channel comprises at least one bypass passage extending from at least one—in particular only one—inlet provided upstream of the superposition zone. Owing to the invention, it is possible to minimise the height of the accumulation channels and to superpose the objects over the entire height of each accumulation channel, any risk of overflow being avoided owing to the bypass passages.

This superposition of objects in a superposition zone of each accumulation channel can be obtained in any suitable manner, e.g. by mechanical means (immersion sleeve and/or inclined immersion face and/or immersion conveyor) for immersing objects upstream of the superposition zone.

However, the invention is particularly advantageous in the case of hydraulic superposition as described in EP2931635 and U.S. Pat. No. 9,694,366. Thus, in some advantageous embodiments in accordance with the invention, said hydraulic supply device is adapted to be able to form in each accumulation channel a hydraulic stream having, at least locally, a speed able to cause a superposition of the objects held in the superposition zone of the accumulation channel against the closed holding/releasing device so as to hold the objects.

Furthermore, the adjustment of the speed of the hydraulic stream to cause a superposition of the objects can be in the form of different variations. It is possible for example to maintain the speed of the hydraulic stream permanently at a constant and single value able to cause a superposition of the objects. It is also possible to count the objects (or total weight of the objects) introduced into each accumulation channel and to adjust the speed of the hydraulic stream to a value able to cause a superposition of the objects in an accumulation channel after having supplied this accumulation channel with a predetermined minimum number (or weight) of objects. It is likewise possible to detect (for example with photoelectric cells) the height taken up by the objects in the accumulation channel at one or more points along same and to adjust the speed of the hydraulic stream to a value able to cause a superposition of the objects when this height corresponds to a layer of objects. It is likewise possible to detect the presence of objects in an upstream part of the superposition zone, this presence being representative of the formation of at least one layer of objects, the speed of the hydraulic stream then being adjusted to cause a superposition of the objects.

The adjustment of different speeds of the hydraulic stream can be made discretely, i.e. by selecting a speed value from a plurality of predetermined values; or in contrast can be made continuously by continuously increasing the speed of the hydraulic stream until it reaches a value from which a superposition of the objects is detected in at least one predetermined zone of the accumulation channel.

It is likewise possible to adjust the speed of the hydraulic stream to a value able to cause a superposition of the objects in a number of layers greater than 2. For example, the speed of the hydraulic stream is adjusted to a first value as long as the number of objects introduced into an accumulation channel is less than or equal to a first number corresponding to a layer of objects—in particular a layer of objects floating on the surface—in this accumulation channel; then the speed of the hydraulic stream is adjusted to a second value causing a superposition of the objects in two layers when the number of objects introduced into the accumulation channel exceeds the first number and as long as it is less than or equal to a second number corresponding to the presence of two layers of superposed objects in the accumulation channel; then the speed of the hydraulic stream is adjusted to a third value causing a superposition of the objects in three layers when the number of objects introduced into the accumulation channel exceeds the second number and as long as it is less than or equal to a third number corresponding to the presence of three layers of superposed objects in the accumulation channel, etc.

Advantageously, in some embodiments in accordance with the invention the presence of objects in a zone upstream of each accumulation channel is detected; if the objects are not detected in said upstream zone, a first speed value is imparted to the hydraulic stream downstream of said upstream zone in the accumulation channel; upon detection of the presence of objects in said upstream zone, a second speed value is imparted to the hydraulic stream downstream of said upstream zone in the accumulation channel, this second value being greater than said first value and able to cause a superposition of the objects in the superposition zone of the accumulation channel against the closed holding/releasing device so as to hold the objects. Said first speed value is advantageously adapted to allow the superposition zone to be supplied with objects and objects to be accumulated in the superposition zone, avoiding any damage to the objects under the effect of impacts of the objects on the holding/releasing device and with each other. Therefore, the speed of the hydraulic stream is initially adjusted to a first, relatively low, value sufficient to start supplying the hydraulic channel with objects minimising the impacts of the objects against each other during this initial supply which has the effect of forming a first layer of objects—in particular a first layer of objects floating on the surface of the hydraulic stream—in the accumulation channel. However, this first speed value of the hydraulic stream is not necessarily sufficient itself to cause a hydraulic superposition of the products. When the objects are detected in the upstream zone, i.e. when a first layer of objects is formed, this risk of impact no longer exists and it is thus possible to increase the speed of the hydraulic stream to a second value sufficient, during at least a certain time period, to thus cause a hydraulic superposition of the objects in the superposition zone.

The speed of the hydraulic stream formed in each accumulation channel can be adjusted by means for setting the flow rate of liquid delivered to an upstream inlet of each accumulation channel. This setting of flow rate can itself be effected using a simple butterfly valve and/or by adjusting the flow rate delivered by a pump, named channel pump, upstream of each accumulation channel, or otherwise. However, it is an advantage of the invention to allow such a channel pump upstream of each accumulation channel to be dispensed with.

Therefore, in some possible embodiments of the invention said hydraulic supply device comprises, upstream of each accumulation channel, a controlled valve, named channel valve, arranged to be able to be placed at least in a position corresponding to a speed value of the hydraulic stream able to cause a superposition of the objects in the superposition zone of the accumulation channel against the closed holding/releasing device so as to hold the objects. Each channel valve is for example arranged to be able to be placed in at least one first position corresponding to a first average speed value of the hydraulic stream in said accumulation channel and in at least one second position corresponding to at least one second average speed value, greater than each first value, of the hydraulic stream able to cause a superposition of the objects in the superposition zone of the accumulation channel against the closed holding/releasing device so as to hold the objects. There can be provided a control unit adapted to control each channel valve between said positions.

In some possible embodiments of the invention, the hydraulic stream is accelerated locally by a reduction in the cross-section of the accumulation channel—in particular by an elevation in the bottom and/or by a reduction in the width of the accumulation channel—provided upstream—in particular at the upstream end—of said superposition zone. This reduction in the cross-section is advantageously provided downstream—in particular immediately downstream—of said upstream zone (in which the presence of objects is detected) and downstream—in particular immediately downstream—of said upstream portion receiving the supply of objects and a hydraulic supply.

Such a reduction in the cross-section (or neck) in an accumulation channel has the effect of locally increasing the speed of the hydraulic stream. Preferably, said reduction in the cross-section of the accumulation channel is obtained by an elevation extending upwards with respect to the bottom of the accumulation channel, without modifying its width, and extends over a short, non-zero length upstream of said superposition zone and downstream of said upstream zone in which the presence of the objects is detected. Therefore, in some advantageous embodiments each accumulation channel comprises a bottom, side walls and, upstream of said superposition zone, an elevation with respect to the bottom forming a reduction in the cross-section of the accumulation channel.

This local acceleration of the speed in the accumulation channel means that it can be ensured in particular that the objects, after superposition, do not return upstream past said reduction in the cross-section, tending to be re-aligned with a lower superposition rate when the speed of the hydraulic stream is returned to said first value. Furthermore, this reduction in the cross-section allows a hydraulic superposition to be obtained under the effect of the locally accelerated speed for a lower average speed value of the hydraulic stream and a lower total flow rate of the hydraulic stream in the accumulation channel.

In the embodiments mentioned above in which the grouping device comprises means for individually adjusting the speed of supplying each accumulation channel, the speed of the hydraulic stream can be maintained at said second value during a predetermined time period upon detection of the presence of objects in said upstream zone. In these embodiments, a grouping device in accordance with the invention is thus also characterised in that it further comprises at least one sensor for detecting the presence of objects in an upstream zone of each accumulation channel, each presence-detecting sensor being connected to the control unit, and in that the control unit is adapted to control each channel valve in a second position (able to cause a hydraulic superposition as mentioned above) upon reception of a signal from the presence-detecting sensor representing the presence of objects in said upstream zone of the corresponding accumulation channel.

Advantageously, this time period is determined to ensure that the superposition of the objects in the superposition zone has the effect of urging all the objects downstream past the reduction in cross-section, preferably immediately downstream of the reduction in cross-section. In other words, said time period during which the speed of the hydraulic stream is adjusted to the second value causing the superposition of the objects is selected such that the upstream front of the objects accumulated in the superposition zone is located downstream—in particular immediately downstream—of the zone of the accumulation channel having said reduction in cross-section, i.e. the upstream end of the superposition zone. The presence of objects in said upstream zone is thus no longer detected. This time period can typically be of the order of several tenths of seconds to several seconds. At the end of said predetermined time period, the speed of the hydraulic stream can be returned to said first value adapted to supply the accumulation channel with objects in optimum conditions. The objects continue to be supplied in the accumulation channel accumulating one against another upstream from this upstream front facing the zone having said reduction in cross-section (i.e. above the elevation in the bottom in the embodiment mentioned above) until the presence of objects is once again detected in said upstream zone. The process is thus repeated by adjusting the speed of the hydraulic stream to said second value to once again effect a superposition of objects which are urged towards the closed holding/releasing device. Advantageously and in accordance with the invention, said first value of the speed as well as the reduction in cross-section are selected such that the objects can be superposed, extending from downstream of the reduction in cross-section to the holding/releasing device without tending to once again spread out into a lower degree of superposition.

A grouping device in accordance with the invention can likewise be characterised by all or some of the features mentioned in EP2931635 or U.S. Pat. No. 9,694,366.

In a grouping device in accordance with the invention, each accumulation channel can be provided with a plurality of bypass passages, e.g. having inlets arranged at different locations of the accumulation channel. However, in some embodiments of the invention each accumulation channel is provided with a single bypass passage.

Similarly, there is nothing to prevent provision being made that a single bypass passage can be supplied from several separate inlets arranged at different locations of the accumulation channel That being said, in some embodiments of the invention each bypass passage is provided with a single inlet. Similarly, advantageously each bypass passage is provided with a single outlet.

Furthermore, each inlet of a bypass passage is placed such that it can be supplied by some of the hydraulic stream flowing in the accumulation channel There is nothing to prevent the provision of at least one such inlet extending at least in part at a side wall of the accumulation channel. However, in some embodiments in accordance with the invention each accumulation channel comprises a bottom (on which the hydraulic stream flows between the upstream portion of the accumulation channel and the device for holding/releasing the objects), side walls and at least one bypass passage extending from at least one—in particular only one—inlet provided in the bottom of the accumulation channel Such a bypass passage is thus formed independently of the bottom and side walls of the accumulation channel and thus does not modify the features of the accumulation channel itself, which can in particular be cleaned simply in the usual manner. Furthermore, said portion of the hydraulic stream which is diverted into such a bypass passage can flow into the bypass passage simply by gravity, without requiring any specific pumping action.

Similarly, there is nothing to prevent the provision of one or more bypass passages extending on the side of an accumulation channel. However, advantageously and in accordance with the invention at least one bypass passage of each accumulation channel extends beneath the accumulation channel.

There is nothing to prevent the provision of one or more bypass passages formed themselves of a channel (i.e. having a bottom and side walls). However, advantageously and in accordance with the invention at least one—in particular each—bypass passage is formed of at least one conduit, i.e. is closed between each inlet and each outlet of the bypass passage. In particular, in some embodiments at least one—in particular each—bypass passage is formed of a conduit extending between an inlet and an outlet of this conduit.

In some preferred embodiments, each accumulation channel comprises a bypass passage formed of a conduit extending beneath the accumulation channel between an inlet of the bypass passage provided in the bottom of the accumulation channel and an outlet issuing downstream of the holding/releasing device.

Furthermore, in the embodiments mentioned above in which each accumulation channel comprises an elevation with respect to the bottom forming a reduction in cross-section it is particularly advantageous that each accumulation channel comprises at least one bypass passage extending from at least one inlet provided in a zone of the bottom comprising said elevation.

More particularly, in some embodiments each accumulation channel comprises at least one bypass passage extending from at least one inlet formed by a grating forming said elevation at least in part.

Still more particularly and advantageously, said elevation comprises a solid upstream part and a downstream part forming said inlet grating of a bypass passage.

Furthermore, the outlet of each bypass passage issues downstream of the holding/releasing device. Advantageously and in accordance with the invention, at least one bypass passage of each accumulation channel has an outlet issuing into said collecting channel beneath the holding/releasing device. In these embodiments, the bottom of the collecting channel is thus arranged at a lower level than the bottom of each accumulation channel. The hydraulic stream can thus flow simply by gravity into the bypass passage without requiring any pumping action.

Furthermore, in some preferred embodiments of a grouping device in accordance with the invention at least one—in particular each—bypass passage of each accumulation channel comprises a valve, named bypass valve, adapted to allow adjustment of said portion of the flow of the hydraulic stream diverted by the bypass passage.

Such a bypass valve allows the value of the flow diverted by the bypass passage of the accumulation channel to be adjusted, in particular based on the family and/or variety and/or physical features of the fruit or vegetables. In particular, it allows this value of the diverted flow to be minimised and in contrast the non-diverted flow which flows in the accumulation channel to be optimised to transport the objects and accumulate them against the holding/releasing device. Therefore, when the objects are of the type which form a large barrier to the flow of the stream in the accumulation channel, for example in the case of pears, the bypass valve can be opened to the maximum extent so as to prevent any risk of overflow. In contrast, when the objects supplied in the accumulation channel are of the type forming a smaller barrier the bypass valve can be more or less closed, or even totally closed, for example in the case of apples floating on the service. The bypass valve can be placed in the intermediate position depending upon the type of objects, for example in the case of small apples.

That being said, a bypass valve may not be provided in a grouping device in accordance with the invention, in particular if this grouping device is intended to process only objects of the same type, e.g. only pears.

Such a bypass valve likewise has other advantages: it allows the bypass passage to be temporarily closed to discharge any objects which have accumulated at the inlet of this bypass passage under the effect of the hydraulic stream being sucked into this bypass passage; it allows the flow rate of the hydraulic stream flowing in the accumulation channel to be temporarily adjusted without having to modify the flow speed of the hydraulic stream supplied to the inlet of the accumulation channel, e.g. to facilitate discharging of the objects to the collecting channel, in particular at the end of discharging.

In particular, the adjustment of the flow rate delivered in such a bypass passage by such a bypass valve thus allows the speed of the hydraulic stream to be adjusted locally at the reduction in cross-section and downstream of the elevation based on the features of the objects supplied in the accumulation channel. In particular, by closing the bypass valve it is possible to accelerate, during a certain time period, the speed of the hydraulic stream at said elevation, to promote the superposition of the objects and the discharging thereof if some of them have accumulated on the elevation owing to the suction caused by the bypass passage.

Furthermore, in a grouping device in accordance with the invention each bypass valve can be arranged at any location of the bypass passage. That being said, in some advantageous embodiments said bypass valve is arranged at a downstream end of said bypass passage. In this manner, it is in particular possible to easily clean the bypass passage using a brushing device introduced through the inlet thereof.

In some advantageous embodiments of a grouping device in accordance with the invention, each bypass valve comprises an individual control device adapted to allow individual adjustment of said portion of the flow diverted from the accumulation channel independently of said portion of the flow diverted from each other accumulation channel.

That being said, there is nothing to prevent—as a variation or in combination—the provision of a type of common control for all of the different bypass valves of the different bypass passages of the different accumulation channels of the grouping device.

Furthermore, in some embodiments of a grouping device in accordance with the invention said device for supplying objects is a selective supply device comprising at least one line, named grading line, for conveying, analysing and sorting objects based on predetermined criteria, said grading line comprising means for selectively discharging the objects into the different accumulation channels. It is thus a unit for sorting fruit or vegetables based on predetermined sorting criteria.

More particularly, in some advantageous embodiments the different accumulation channels are in parallel with each other and each grading line of the selective supply device is at least substantially orthogonal to each accumulation channel. Similarly, the collecting channel is advantageously orthogonal to the accumulation channels. Advantageously, a grouping device in accordance with the invention likewise comprises at least one station for receiving batches of objects delivered by said collecting channel and a circuit for recirculating the hydraulic stream between each station for receiving batches of objects and said hydraulic supply device of each accumulation channel. In some possible embodiments of a grouping device in accordance with the invention, said recirculation circuit comprises a single pump.

The invention likewise relates to a grouping method implemented in a grouping device in accordance with the invention.

The invention likewise relates to grouping device and method which are characterised in combination or individually by all or some of the features mentioned above or below. However they are formally presented, unless explicitly stated otherwise, the different features mentioned above or below should not be considered to be closely or inextricably linked with each other, the invention being able to relate to only one of these structural or functional features, or only some of these structural or functional features, or only part of one of these structural or functional features, or even any group, combination or juxtaposition of all or some of these structural or functional features.

BRIEF DESCRIPTION OF THE DRAWINGS

Other aims, features and advantages of the invention will become apparent upon reading the following description given by way of non-limiting example of some possible embodiments thereof, and which makes reference to the attached figures in which.

DETAILED DESCRIPTION

Figure 1:
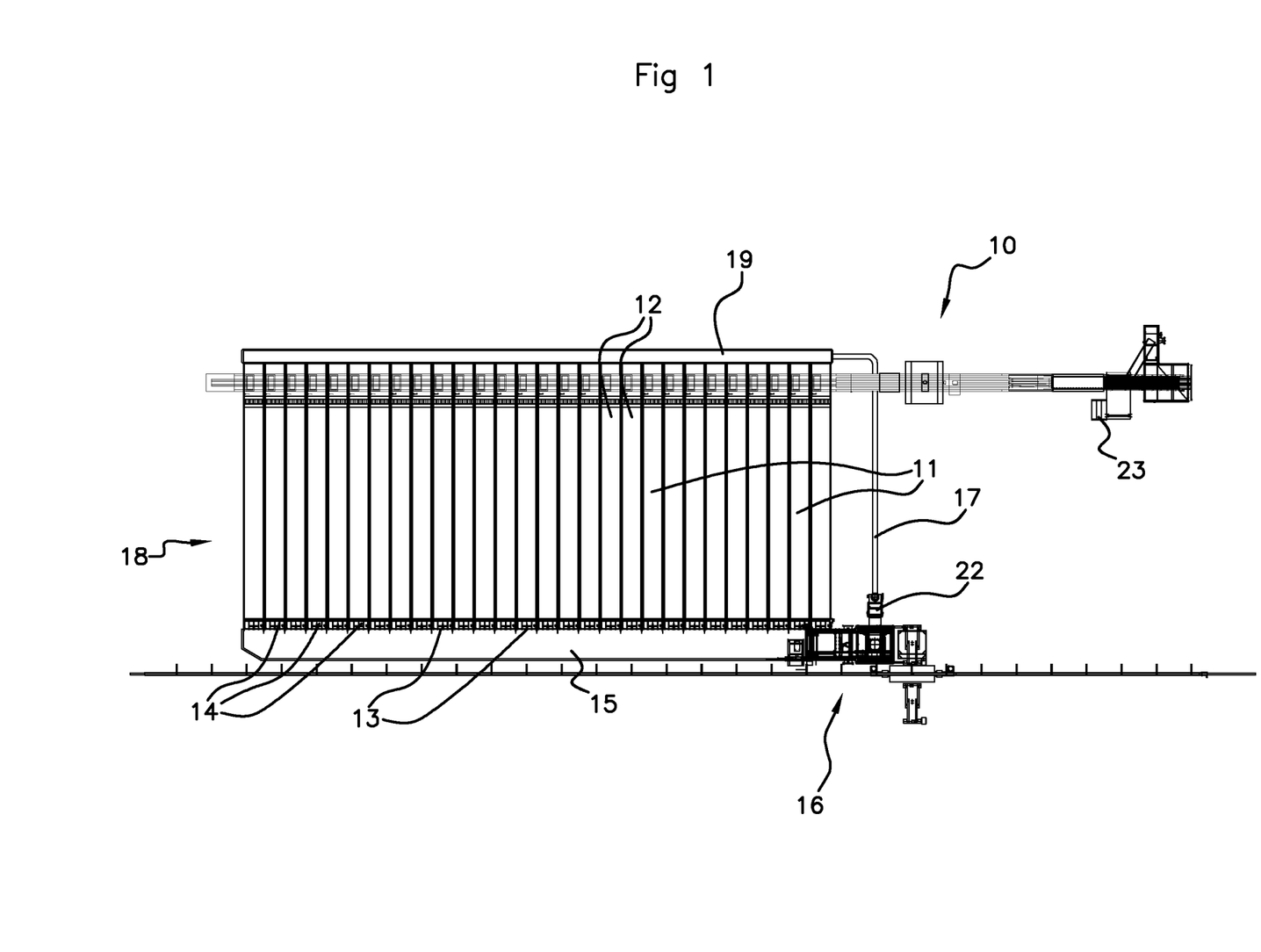
FIG. 1 is a top schematic view of a grouping device in accordance with the invention.

The device in accordance with the invention shown in the figures comprises a line 10 for conveying, analysing and sorting objects based on predetermined criteria, this line 10, named grading line 10, being provided with means (not shown) for selectively discharging the objects into different accumulation channels 11 which extend, on the whole, orthogonally to the grading line 10, with an upstream end portion 12 located beneath the discharging means of the grading line 10. Such a grading line 10 is well known per se (cf. for example in particular EP 0729908, U.S. Pat. Nos. 7,159,373, 5,230,394, 5,280,838, 5,626,238, 6,234,297 . . . ). It generally has different object-analysing stations (weighing, optical analysis . . . ) Such a device can comprise any number—for example 5 to 50—of accumulation channels 11 in parallel with each other and which adjoin one another laterally, and a collecting channel 15 extending orthogonally to the accumulation channels 11 along their downstream outlet ends.

Preferably, each accumulation channel 11 is adapted to be able to receive a batch of objects intended to fill a single crate or box pallet (palox) at a receiving station 16 supplied by the collecting channel 15. However, this is not necessary and it is still possible that each batch of objects contained in an accumulation channel and released into the collecting channel 15 is subjected to more processing at the receiving station 16 or several receiving stations. Whatever the case may be, each accumulation channel 11 has a length sufficient to be able to receive all the objects of a single batch, to be subjected to the same subsequent processing. In practice, each accumulation channel 11 receives objects having specific features in terms of selection criteria, for example a predetermined size when the objects are fruit or vegetables. In a single batch, all the objects thus have the same features, in particular the same size.

A hydraulic stream (generally water, possibly with processing additives) is supplied to, and passes along, the accumulation channels 11, said stream being generated by a hydraulic supply device provided with pumping and recirculation means, as described in terms of its general features for example by U.S. Pat. No. 7,159,373. The hydraulic stream formed in each accumulation channel 11 is adapted to be able to ensure the transportation of at least semi-buoyant objects in the hydraulic stream, the latter having a free upper surface.

The hydraulic supply device comprises in particular a supply conduit 19 extending along all the upstream ends 12 of the accumulation channels 11 receiving the hydraulic flow generated by a recirculation pump 22, common to the different accumulation channels 11, itself being connected to at least one receiving station 16 and to a conduit 17 for recirculating the hydraulic stream in a closed circuit, this recirculation conduit 17 connecting the pump 22 to the supply conduit 19.

The hydraulic stream flows in the accumulation channels 11 from their upstream portion 12 extending beneath the discharging means of the grading line 10 to their opposite downstream end 13 provided with a holding/releasing device 14 allowing, in a closed position, the objects to be held in the accumulation channel whilst allowing the hydraulic stream to pass therethrough, and allowing, in the open position, said objects to be released under the effect of the hydraulic stream to transfer them into the collecting channel 15 located downstream of all the accumulation channels 11. This holding/releasing device 14 of each accumulation channel is thus transparent with respect to the hydraulic stream flowing in the accumulation channel, including when this holding/releasing device is in the closed position for holding objects in the superposition zone. This holding/releasing device 14 can be formed by a simple movable grating, as described for example in WO 2012056186. That being said, there is nothing to prevent provision being made that this holding/releasing device 14 likewise has the function of orienting at least some of the hydraulic stream to a specific zone of the collecting channel, i.e. it has at least one deflector for the hydraulic stream.

All of the grouping device in accordance with the invention is controlled by an (automated) control unit 23, generally formed by a computer system, adapted to control the different actuators, cylinders and motors of the entire installation, in particular the grading line 10, the discharging means, the holding/releasing devices 14 of the accumulation channels 11, the receiving station 16, the hydraulic supply device . . . . This control unit 33 also receives different signals from different sensors or detectors of the device.

A grouping device in accordance with the invention can be used for example as a unit for grading fruit or vegetables, for example apples or pears, or other at least semi-buoyant fruit or vegetables, the receiving station 16 allowing each batch of objects from an accumulation channel to be packaged in a single package, for example an open crate and/or a box crate generally known as a "palox", as described for example in FR2868042 or U.S. Pat. No. 7,159,373. As a variation, the receiving station 16 can be adapted to transfer each batch to a device for individual or grouped packaging of objects of the batch.

In the illustrated embodiment, the grouping device in accordance with the invention allows the creation, in each accumulation channel 11, of a superposition of the objects in several layers in the hydraulic stream of the accumulation channel 11, and to do so in a portion of the accumulation channel, named superposition zone 18, which is located downstream of said upstream portion 12 of the accumulation channel 11. This superposition zone 18 must have as long a length as possible with respect to the total length of the accumulation channel 11 between its upstream portion 12 and its downstream end 13.

Figure 2:
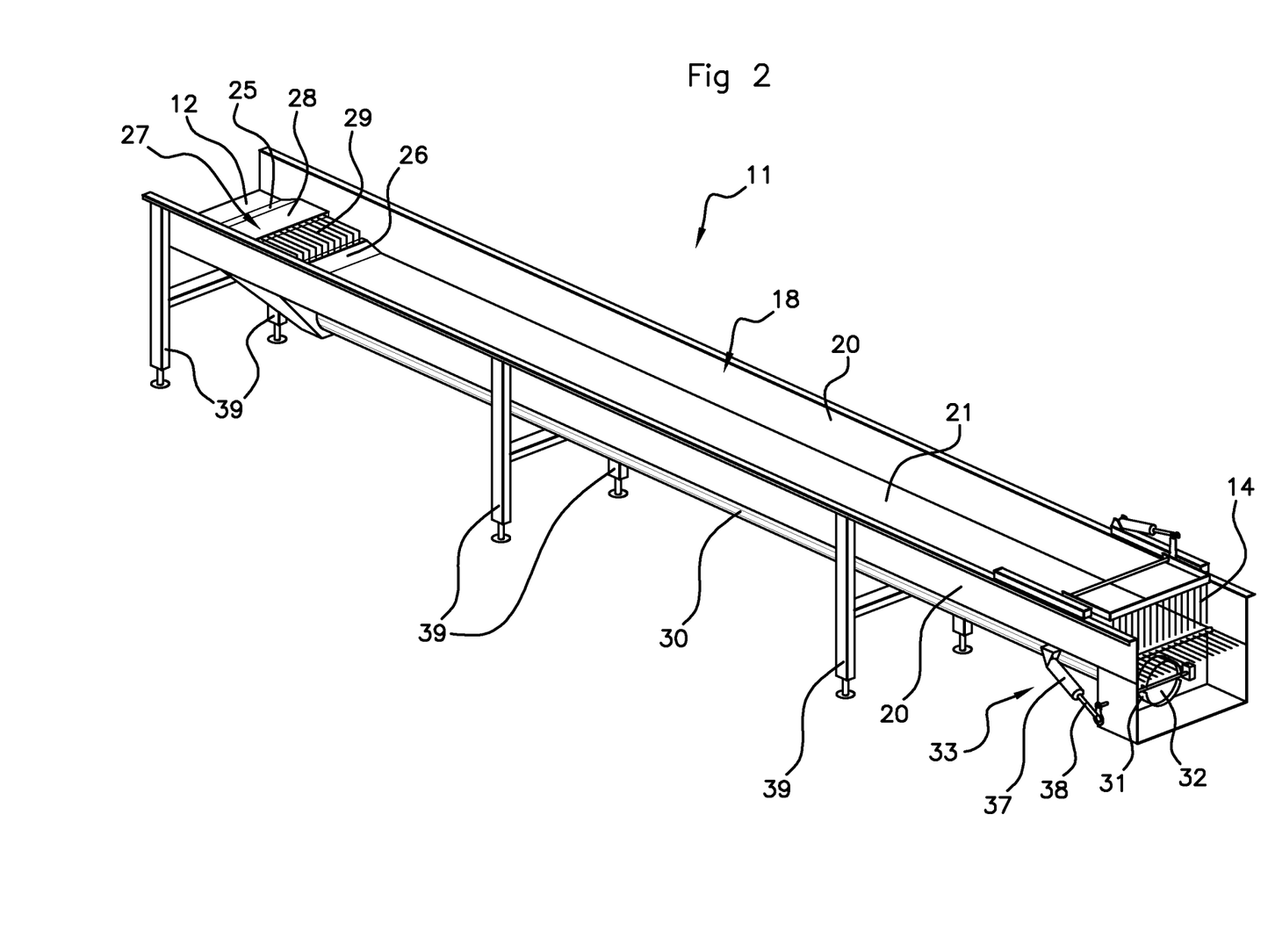
FIG. 2 is a perspective diagram of one possible embodiment of an accumulation channel of a grouping device in accordance with the invention.

Each accumulation channel 11 comprises a bottom 21 and vertical side walls 20, this bottom 21 and its vertical side walls 20 being adapted to contain the hydraulic stream. Each accumulation channel 11 is open at the top. In the illustrated example, the bottom 21 of the accumulation channel 11 is, on the whole, horizontal and the vertical side walls 20 are of uniform height over the entire length of the accumulation channel 11. However, there is nothing to prevent provision being made that the accumulation channel 11 has a variable height, preferably increasing downstream, to facilitate the superposition of objects in the superposition zone 18.

Whatever the case may be, at least in the superposition zone 18, the total height of the accumulation channel 11 is greater than the maximum vertical size of each object so as to be able to receive the superposed objects. Preferably, the total height of the accumulation channel 11 is greater than twice the maximum vertical size of each object and is adapted to allow the vertical superposition of at least two objects, one above the other, in the hydraulic stream formed in the accumulation channel 11.

It should be noted that in the superposition zone 18, the at least semi-buoyant fruit or vegetables are not necessarily superposed strictly in uniform and homogeneous layers but in contrast more or less partially fit together, some of the objects being pushed down to be more fully immersed whilst others are possibly pushed up and are immersed to a lesser extent.

Figure 4:
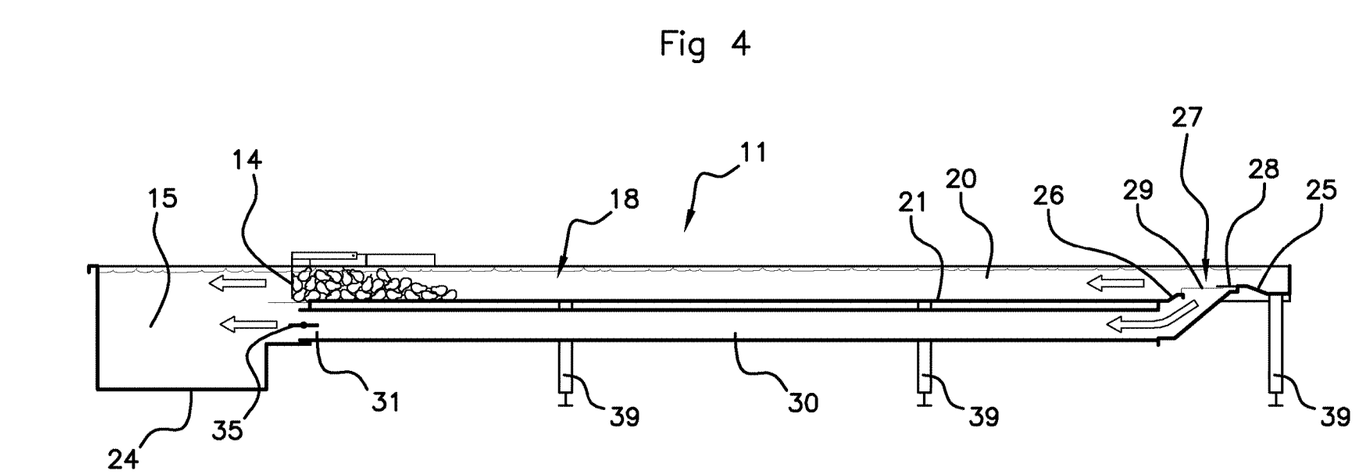
FIG. 4 is a longitudinal, vertical, cross-sectional, schematic view of an accumulation channel of a grouping device in accordance with the invention, the bypass valve being in the open state.

Each accumulation channel 11 is provided, immediately downstream of the upstream portion 12 thereof receiving the objects discharged by the grading line 10, with an elevation 27 in its bottom 21, this elevation 27 forming, with respect to the superposition zone 18, a reduction in cross-section having the effect of locally accelerating the speed of the hydraulic stream with respect to the average speed of the hydraulic stream in the accumulation channel and in particular with respect to the speed of the hydraulic stream at said upstream portion 12 supplying objects and with respect to the speed of the hydraulic stream in the superposition zone 18. The elevation 27 of the bottom 21 of each accumulation channel 11 is arranged as far upstream as possible in the accumulation channel 11 immediately downstream of the upstream portion 12 receiving the objects discharged by the grading line 10.

The elevation 27 is formed by a protuberance on the bottom 21 with respect to the level of this bottom 21 in the superposition zone 18. Therefore, for example, whilst the depth of the hydraulic stream formed in the accumulation channel 11 is for example of the order of 250 mm to 300 mm in the superposition zone 18, this same hydraulic stream has a depth of the order of 120 mm to 180 mm in line with the elevation 27. The elevation 27 is continuously connected to the bottom 21 of the superposition zone 18 by a downstream inclined face 26 and to the bottom 21 of the upstream portion 12 of the accumulation channel 11 by an upstream inclined face 25.

The raised horizontal part forming the elevation 27 comprises a first upstream portion 28 of solid wall extended downstream by a second downstream portion in the form of a grating 29 forming an inlet of a bypass passage 30 of the accumulation channel 11. This grating 29 allows the passage of the liquid forming the hydraulic stream into the bypass passage 30 but holds the objects, preventing them passing into the bypass passage 30.

Figure 3:
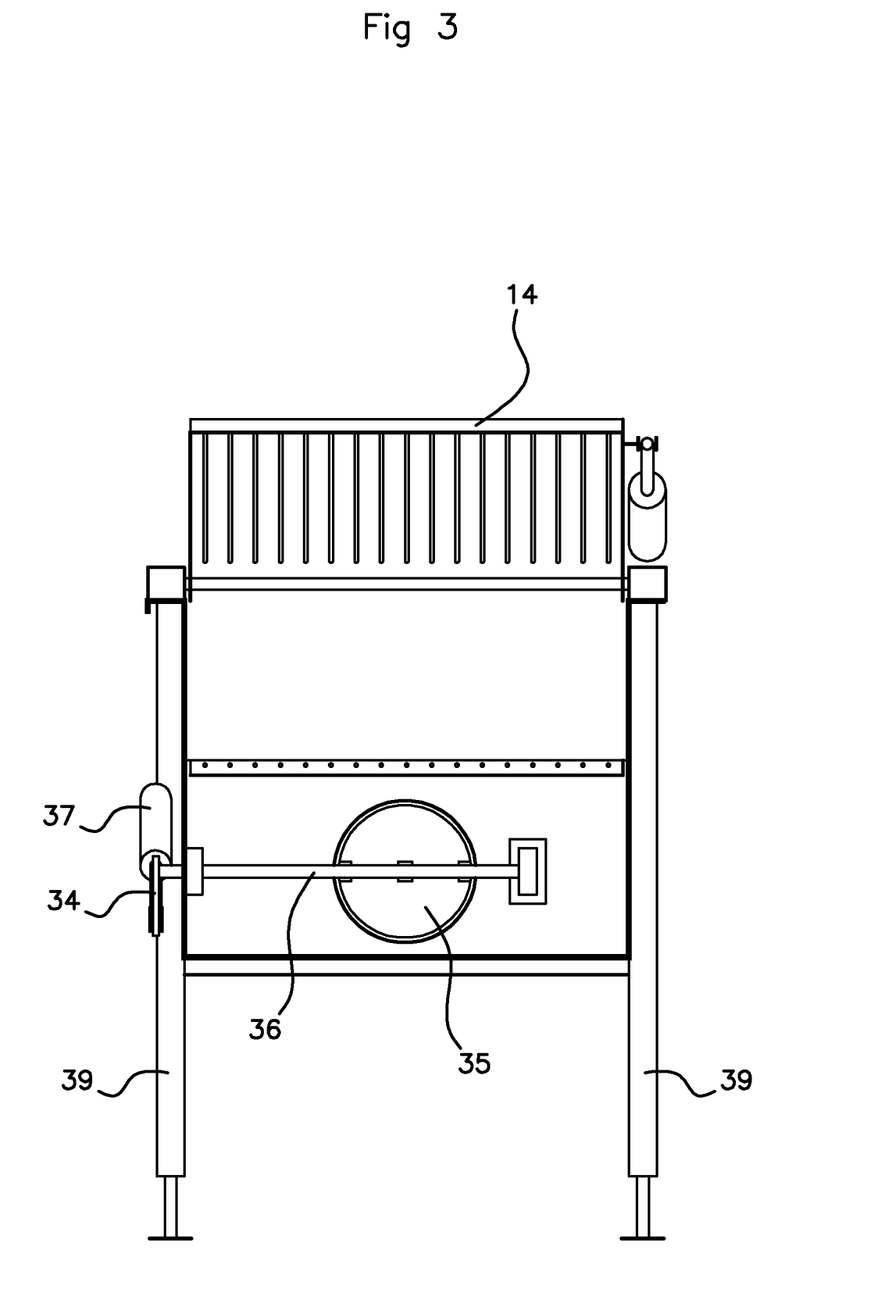
FIG. 3 is a schematic elevation of the downstream end of an accumulation channel of a grouping device in accordance with the invention.

The accumulation channel 11 is supported by legs 39 which rest on the ground such that the bottom 21 is generally horizontal, preferably slightly inclined downwards downstream and located above the ground at a height sufficient to provide a vertical space in which the bypass passage 30 can extend, said passage being formed by a bypass conduit 30 extending from, and beneath, the grating 29 along the bottom 21 of, and beneath, the accumulation channel to a downstream end 31 of this bypass conduit 30 which issues into the collecting channel 15 beneath the holding/releasing device 14. It should be noted in particular that the collecting channel 15 has a bottom 24 which is located below the bottom 21 of each accumulation channel 11 such that the downstream end 31 of the bypass conduit 30 can issue into the collecting channel 15 between the bottom 24 thereof and the bottom 21 of the accumulation channel 11.

The downstream end 31 of the bypass conduit 30 is provided with a valve, named bypass valve 32, controlled by a cylinder 33 and allowing the adjustment of the diverted flow of the hydraulic stream flowing in the bypass conduit 30.

Figure 5:
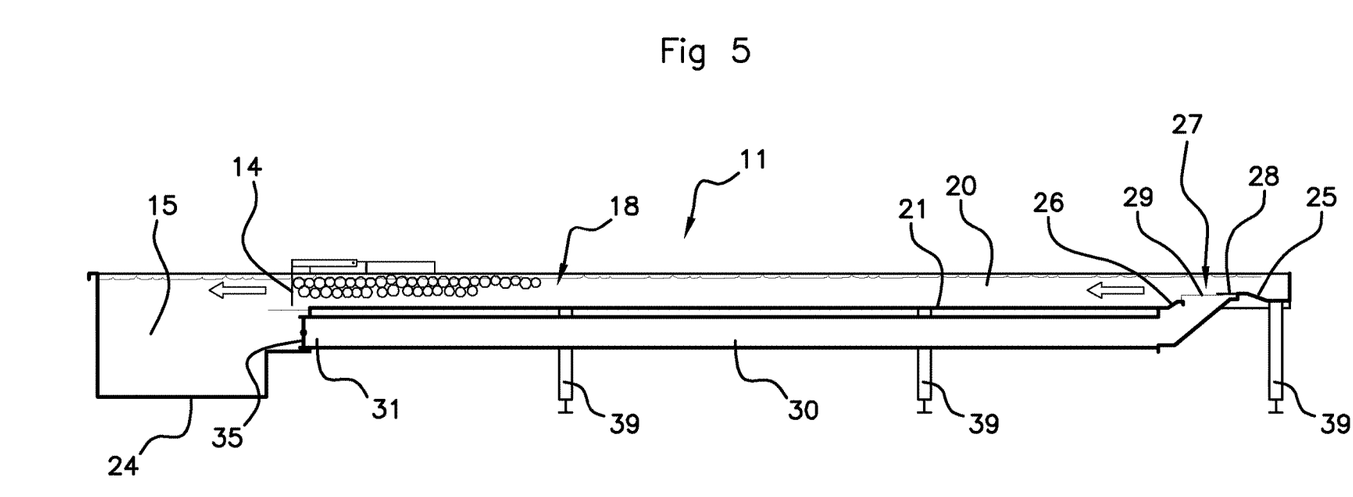
FIG. 5 is a longitudinal, vertical, cross-sectional, schematic view of an accumulation channel of a grouping device in accordance with the invention, the bypass valve being in the closed state.

Therefore, when the bypass valve 32 is closed all of the hydraulic stream flows downstream of the elevation 27 into the superposition zone 18 above the bottom 21 to the holding/releasing device 14.

In contrast, when the bypass valve 32 is open some of the hydraulic stream flows by gravity into the bypass conduit 30 through the inlet grating 29 and is delivered into the collecting channel 15 via the downstream end 31 of this bypass conduit 30 without passing through the fruit or vegetables accumulated in the superposition zone 18 nor through the holding/releasing device 14. In this manner, the flow rate of the hydraulic stream which passes into the superposition zone 18 is even lower. The value of the flow diverted by the bypass conduit 30 depends upon the degree to which the bypass valve 32 is opened.

In the illustrated example, the bypass valve 32 is a butterfly valve comprising a movable disk 35 rotationally driven by a horizontal shaft 36 itself rotationally driven by the cylinder 33, the body 37 of which is fixed beneath a lateral wall 20 of the accumulation channel 11 and the actuation rod 38 of which is articulated on a small connecting rod 34 attached to the shaft 36 of the bypass valve 32 for conjoint rotation therewith. Each of the cylinders 33 of each bypass valve 32 of each accumulation channel 11 can be controlled from the control unit 23.

In the state shown in FIG. 4, it can be seen that the objects are for example pears which are accumulated against the holding/releasing device 14 and superposed in the superposition zone 18, forming a barrier which is of low transparency with respect to the hydraulic stream. The bypass valve 32 is fully opened, the hydraulic stream can mostly flow through the bypass conduit 30 without overflowing. In contrast, in the state shown in FIG. 5 the objects are for example apples floating on the surface of the hydraulic stream and, owing to their shape, allow the hydraulic stream to flow through the holding/releasing device 14. The bypass valve 32 is fully closed such that all the flow of the hydraulic stream supplied to the inlet of the accumulation channel 11 can be used to transport and superpose the objects in the accumulation channel 11.

Of course, the bypass valve 32 can be placed in an intermediate position, depending upon the features of the objects contained in the superposition zone 18 and upon the barrier effect produced thereby with respect to the hydraulic stream. It is possible to determine the appropriate position of each bypass valve 32 based on the objects being processed, and to do so via a simple observation of the behaviour of the installation. Each bypass valve 32 can be controlled manually from the control unit 23 by an operator.

As a variation, there is nothing to prevent provision being made that the control unit 23 executes an automatic operation assigning the control of the position of the bypass valve 32 to a sensor for the level of the liquid immediately downstream of the elevation 27 so as to keep the surface of the hydraulic stream below a predetermined level in each accumulation channel 11.

It is likewise possible to provide a sensor for detecting the presence of objects blocked at the inlet grating 29 of the bypass passage 30, the control unit 23 controlling the closure of the bypass valve 32 if such objects are detected, which has the effect of cancelling the flow which is diverted into the bypass passage 30 and of discharging any objects blocked at the grating 29 downstream into the accumulation channel.

The bypass valve 32 can likewise be used to facilitate the discharging of objects into the collecting channel when the holding/releasing device 14 is placed in the releasing position. In fact, the closure of the bypass valve 32 has the effect of instantaneously increasing the flow rate of the hydraulic stream transporting the objects downstream into the collecting channel which may allow the discharging process to be accelerated and thus the productivity of the installation to be improved.

The invention can cover numerous variations and applications other than those described above. In particular, it goes without saying that, unless stated otherwise, the different structural and functional features of the embodiment described above do not have to be considered as being combined and/or closely and/or inextricably linked with each other. Furthermore, these structural and/or functional features can form, in full or in part, any group, sub-group, juxtaposition or combination.

For example, the bypass conduits 30 can be replaced by bypass channels and/or arranged between the accumulation channels 11; a single bypass passage 30 can receive the hydraulic stream from several accumulation channels 11; a single accumulation channel 11 can have several bypass passages 30; a single bypass passage 30 can receive the hydraulic stream from several different inlets located at different locations of a single accumulation channel 11 or several different accumulation channels 11; an inlet of each bypass conduit 30 can be provided on the bottom 21 of the accumulation channel 11 at a location different from that of the elevation 27 and/or at the side walls of the accumulation channel 11; the bypass valves 32 can be of any design other than butterfly valves; if the bypass passages 30 are preferably liquid passages in which the hydraulic stream can flow simply by gravity, there is nothing to prevent supplying all or some of the bypass passages 30 by a pumping device . . . .

The invention claimed is:

1. A device for grouping into batches at least semi-buoyant objects belonging to the group of fruit and vegetables, said device comprising:
   a plurality of channels, named accumulation channels,
   a hydraulic supply device adapted to form, in each accumulation channel, a flow of a hydraulic stream able to transport the objects along the accumulation channel,
   an object supply device for supplying objects to an upstream portion of each accumulation channel,
   a hydraulic channel, named collecting channel, downstream of and in communication with each accumulation channel so as to be able to receive the hydraulic stream and the objects discharged by the accumulation channel,
   each accumulation channel being provided, at a downstream end thereof, with a holding/releasing device for holding/releasing the objects contained therein, this holding/releasing device being transparent with respect to the hydraulic stream flowing in the accumulation channel and allowing, in a closed position, the objects to be held in the accumulation channel whilst allowing the hydraulic stream to pass therethrough and allowing, in the open position, them to be released under the effect of the hydraulic stream to transfer them into the collecting channel,
   each accumulation channel has, at least in a downstream portion thereof, named superposition zone, a height greater than the maximum vertical size of each object so as to be able to receive superposed objects,
   wherein each accumulation channel comprises at least one bypass passage for the hydraulic stream:
   said bypass passage extending from at least one inlet of the bypass passage located upstream of the holding/releasing device and upstream of the superposition zone, to at least one outlet of the bypass passage issuing downstream of the holding/releasing device, and
   said bypass passage adapted to divert, upstream of the superposition zone, some of the flow of the hydraulic stream formed by the hydraulic supply device, while allowing accumulation channel to receive a remaining part of the flow.

2. The device according to claim 1, wherein said hydraulic supply device is adapted to be able to form in each accumulation channel a hydraulic stream having, at least locally, a speed able to cause a superposition of the objects held in the superposition zone of the accumulation channel against the closed holding/releasing device so as to hold the objects.

3. The device according to claim 2, wherein said device further comprises means for setting the flow rate of liquid delivered to an upstream inlet of each accumulation channel.

4. The device according to claim 1, wherein said hydraulic supply device comprises, upstream of each accumulation channel, a controlled valve, named channel valve, arranged to be able to be placed at least in a position corresponding to a speed value of the hydraulic stream able to cause a superposition of the objects in the superposition zone of the accumulation channel against the closed holding/releasing device so as to hold the objects.

5. The device according to claim 1, wherein each accumulation channel comprises a bottom, side walls and, upstream of said superposition zone, an elevation with respect to the bottom forming a reduction in the cross-section of the accumulation channel.

6. The device according to claim 1, wherein each accumulation channel comprises a bottom, side walls and at least one bypass passage extending from at least one inlet provided in the bottom of the accumulation channel.

7. The device according to claim 5, wherein each accumulation channel comprises at least one bypass passage extending from at least one inlet provided in a zone of the bottom comprising said elevation.

8. The device according to claim 7, wherein each accumulation channel comprises the at least one bypass passage extending from at least one inlet formed by a grating forming said elevation at least in part.

9. The device according to claim 8, wherein said elevation comprises a solid upstream part and a downstream part forming said inlet grating of the bypass passage.

10. The device according to claim 1, wherein each of the bypass passage(s) has an outlet issuing into said collecting channel.

11. The device according to claim 1, wherein at least one bypass passage of each accumulation channel is formed by a conduit extending beneath the accumulation channel.

12. The device according to claim 1, wherein at least one bypass passage of each accumulation channel comprises a valve, named bypass valve, adapted to allow adjustment of said portion of the diverted flow.

13. The device according to claim 12, wherein said bypass valve is arranged at a downstream end of said bypass passage.

14. The device according to claim 12, wherein each bypass valve comprises an individual control device adapted to allow individual adjustment of said portion of the flow diverted from the accumulation channel independently of said portion of the flow diverted from each other accumulation channel.

15. The device according to claim 1, wherein said device for supplying objects is a selective supply device comprising at least one line, named grading line, for conveying, analysing and sorting objects based on predetermined criteria, said grading line comprising means for selectively discharging the objects into upstream end portions of the different accumulation channels.

16. A device for grouping into batches at least semi-buoyant objects belonging to the group of fruit and vegetables, said device comprising:
- a plurality of channels, named accumulation channels,
- a hydraulic supply device adapted to form, in each accumulation channel, a flow of a hydraulic stream able to transport the objects along the accumulation channel,
- an object supply device for supplying objects to an upstream portion of each accumulation channel,
- a hydraulic channel, named collecting channel, downstream of and in communication with each accumulation channel so as to be able to receive the hydraulic stream and the objects discharged by the accumulation channel,
- each accumulation channel being provided, at a downstream end thereof, with a holding/releasing device for holding/releasing the objects contained therein, this holding/releasing device being transparent with respect to the hydraulic stream flowing in the accumulation channel and allowing, in a closed position, the objects to be held in the accumulation channel whilst allowing the hydraulic stream to pass therethrough and allowing, in the open position, them to be released under the effect of the hydraulic stream to transfer them into the collecting channel,
- each accumulation channel has, at least in a downstream portion thereof, named superposition zone, a height greater than the maximum vertical size of each object so as to be able to receive superposed objects,
- wherein each accumulation channel comprises at least one bypass passage for the hydraulic stream:
- said bypass passage extending from at least one inlet of the bypass passage located upstream of the holding/releasing device and upstream of the superposition zone, to at least one outlet of the bypass passage issuing downstream of the holding/releasing device, and
- said bypass passage adapted to divert, upstream of the superposition zone, some of the flow of the hydraulic stream formed by the hydraulic supply device, while allowing accumulation channel to receive a remaining part of the flow,
- wherein each accumulation channel comprises a bottom, side walls and at least one bypass passage extending from at least one inlet provided in the bottom of the accumulation channel,
- wherein each accumulation channel comprises a bottom, side walls and, upstream of said superposition zone, an elevation with respect to the bottom forming a reduction in the cross-section of the accumulation channel,
- wherein each accumulation channel comprises at least one bypass passage extending from at least one inlet provided in a zone of the bottom comprising said elevation, and
- wherein each accumulation channel comprises the at least one bypass passage extending from at least one inlet formed by a grating forming said elevation at least in part.

* * * * *